United States Patent [19]

Boxhoorn et al.

[11] Patent Number: 4,774,219

[45] Date of Patent: Sep. 27, 1988

[54] BIMETALLIC CATALYST AND PROCESS FOR ITS PREPARATION

[75] Inventors: Gosse Boxhoorn; Petrus F. A. Van Grinsven; Alex G. G. Limahelu, all of Amsterdam, Netherlands

[73] Assignee: Shell Oil Company, Houston, Tex.

[21] Appl. No.: 82,165

[22] Filed: Aug. 6, 1987

[30] Foreign Application Priority Data

Aug. 11, 1986 [GB] United Kingdom ............... 8619536

[51] Int. Cl.[4] ..................... B01J 23/22; B01J 27/135
[52] U.S. Cl. .................................... 502/227; 502/350
[58] Field of Search ............................... 502/227, 350

[56] References Cited

U.S. PATENT DOCUMENTS

| 4,048,112 | 9/1977 | Matsushita et al. | 252/461 |
|---|---|---|---|
| 4,152,296 | 5/1979 | Okabe et al. | 252/440 |
| 4,351,811 | 9/1982 | Matsuda et al. | 423/239 |
| 4,394,252 | 7/1983 | Gleim | 208/134 |

FOREIGN PATENT DOCUMENTS

| 3531871 | 9/1984 | Fed. Rep. of Germany . | |
| 56-65631 | 3/1981 | Japan | 502/350 |
| 162637 | 10/1982 | Japan . | |
| 1430730 | 4/1976 | United Kingdom . | |

OTHER PUBLICATIONS

Shikada et al., "Reduction of Nitric Oxide with Ammonia on Silica-Supported Vanadium Oxide Catalysts," J. Chem. Tech. Biotechnol., 1983, 33A, pp. 446-454.

Primary Examiner—W. J. Shine

[57] ABSTRACT

Process of preparing a bimetallic catalyst comprising
(a) applying a titanium compound to an inorganic carrier;
(b) applying, simultaneously with or after applying the titanium compound, to the inorganic carrier at least one additive which is selected from the group consisting of a bromine compound, a fluorine compound and an iodine compound;
(c) applying, simultaneously with or after applying the additive, to the inorganic carrier a vanadium compound;
(d) drying the carrier; and
(e) subjecting the carrier to a heat treatment at a temperature between 200° C. and 800° C.

14 Claims, No Drawings

BIMETALLIC CATALYST AND PROCESS FOR ITS PREPARATION

FIELD OF THE INVENTION

The present invention relates to a process of preparing a bimetallic catalyst, including an inorganic carrier, titanium and vanadium.

Such a catalyst is used for the conversion of nitrogen oxides.

It is an object of the invention to provide an improved catalyst having a higher activity.

SUMMARY OF THE INVENTION

To this end the process of preparing a bimetallic catalyst according to the invention comprises
  (a) applying a titanium compound to an inorganic carrier;
  (b) applying, simultaneously with or after applying the titanium compound, to the inorganic carrier at least one additive which is selected from the group consisting of a bromine compound, a fluorine compound and an iodine compound;
  (c) applying, simultaneously with or after applying the additive to the inorganic carrier a vanadium compound;
  (d) drying the carrier; and
  (e) subjecting the carrier to a heat treatment at a temperature between 200° C. and 800° C.

It was found that by applying the additive or additives simultaneously with or after appying the titanium compound and by applying the vanadium compound simultaneously with or after applying the additive or additives a catalyst having an improved activity can be prepared.

It is assumed that the activity is improved because the additive improves the dispersion of the metals on the catalyst or because the additive is a promoter. It was found that a bromine compound or an iodine compound has a beneficial effect on the dispersion of the metals, in particular on the dispersion of vanadium, and that a fluorine acts as a promoter.

In a suitable embodiment the carrier is first contacted with a solution containing a titanium compound, and subsequently with an acidic solution containing the additive(s) and a vanadium compound. The pH of the acidic solution used may be less than 5, and suitably less than 4.

In a further suitable embodiment the carrier is first contacted with an acidic solution containing a titanium compound and the additive(s), and subsequently with a solution containing a vanadium compound. The pH of the acidic solution used may be less than 5, and suitably less than 4.

In a further suitable embodiment the carrier is contacted with an acidic solution containing a titanium compound, the additive(s) and a vanadium compound. The pH of the acidic solution used may be less than 5, and suitably less than 4.

The titanium compound used may suitably be a titanium halide, an organic titanium salt, an ortho-titanic acid and the like.

The vanadium compound used may suitably be selected from the group vanadyl chloride, vanadyl bromide, vanadyl sulfate, ammonium poly vanadate and the like.

In a very suitable embodiment the additive is a bromine compound, the bromine compound used may be hydrogen bromide, ammonium bromide and the like.

In an alternative embodiment the additive is a fluorine compound, the fluorine compound used may be hydrogen fluoride, ammonium fluoride and the like.

The above is not meant to be an exhaustive list of titanium vanadium, bromine or fluorine compounds and those of skill in the art of catalyst preparation can appreciate and substitute equivalent titanium, vanadium, bromine or fluorine compounds for the representative illustrations set forth herein.

The catalyst prepared according to the process according to the invention may be used for the reduction of nitrogen oxides, such as NO and $NO_2$ in the presence of $NH_3$. This reduction process comprises contacting a gaseous mixture containing nitrogen oxides at atmospheric pressure, a temperatures between 150° C. and 350° C. and at a gas hourly space velocity between 4000 $Nm^3/m^3$/hour and 10000 $Nm^3/m^3$/hour (1 $Nm^3$ gas equals 1 $m^3$ at 20° C. and 0.1 MPa), wherein the molar ratio of $NH_3$ to nitrogen oxides is slightly below the stiochemometrically required ratio.

The invention further relates to a catalyst for the reduction of nitrogen oxides prepared in the manner as described above comprising an inorganic carrier, 2–15% by mass of titanium, 1–1500 ppm (parts per million by mass) bromine and 2–15% by mass vanadium.

The invention also relates to a catalyst for the reduction of nitrogen oxides prepared in the manner as described above comprising an inorganic carrier, 2–15% by mass of titanium, 0.5–5% by mass fluorine and 2–15% by mass vanadium.

Suitable inorganic carriers are refractory materials, such as silicon oxide or aluminum oxide or mixtures thereof.

Illustrative Embodiment

The invention will now be elucidated in more detail with reference to the following examples which should not be regarded as limiting it in any way.

Unless otherwise specified, the silicon oxide carriers are carriers (ex Shell) having a particle diameter of 1.5 mm, a pore volume $H_2O$ of about 0.9 ml/g and a specific area of 260 $m^2$/g. The acidic solution of $TiCl_4/H_2O$ used is manufactured by Tilcom and contains 9.2% by mass of titanium, the pH of the solution is 0 and its density is 1.33 g/ml.

The specific area of the carriers and of the catalyst samples has been determined using the BET method, and the metal dispersion has been determined using X-ray photo electron spectroscopy (XPS).

EXAMPLE 1

Catalyst sample 1 was prepared according to the invention as follows. In a container 10.35 g ammonium poly vanadate was added to 57.17 g of an acidic solution of $TiCl_4/H_2O$ at a temperature between 50° C. and 58° C., after 2 hours the ammonium poly vanadate was completely dissolved and the color of the solution was dark brown. Heating was stopped. Subsequently 20 ml of an aqueous solution containing 4.45 g HBr was added at a temperature of about 48° C. The obtained solution was further diluted to 80 ml with an aqueous solution containing 18% by mass of hydrogen chloride. The obtained impregnating solution had a green color and it was stable.

Thereupon 85 g of silicon oxide carrier was contacted with 77 ml of the impregnating solution. The color of the carrier was black. The carrier was rotated for 1 hour, dried while being rotated for 1.5 hour, and heated in air by increasing the temperature to 120° C. in 1 hour followed by maintaining the temperature at 120° C. for 8 hours, raising the temperature to 450° C. in 1 hour and maintaining the temperature for 1 hour at 450° C. After this treatment the color of catalyst sample 1 was green.

Data pertaining to catalyst sample 1 have been included in Table 1.

EXAMPLE 2

Catalyst sample 2 was prepared according to the invention as follows. In a container 10.35 g ammonium poly vanadate was added to 57.17 g of an acidic solution of $TiCl_4/H_2O$ and 15 ml of an aqueous solution containing 30% by mass of HCl at a temperature of 22° C. In 10 minutes the temperature was raised to 30° C., and during 30 minutes the temperature was maintained between 30° C. and 35° C. until everything dissolved. To this solution was slowly added 10 ml of an aqueous solution containing 2.62 g $NH_4Br$. In this way 72 ml of a solution having a green brown color was obtained. The obtained solution was further diluted to 78 ml with water. The obtained impregnating solutin was stable.

Thereupon 85 g of silicon oxide carrier was contacted with 78 ml of the impregnating solution. The color of the carrier was black. The carrier was dried while being rotated for 2 hours, and heated in air by increasing the temperature to 120° C. in 1 hour followed by maintaining the temperature at 120° C. for 8 hours, raising the temperature to 450° C. in 1 hour and maintaining the temperature for 1 hour at 450° C. After this treatment the color of catalyst sample 2 was brown green.

Data pertaining to catalyst sample 2 have been included in Table 1.

EXAMPLE 3

Catalyst sample 3 was prepared according to the invention as follows. At first 85 g of silicon oxide carrier was contacted with 78 ml of an aqueous impregnating solution containing 50.43 g of an acidic $TiCl_4/H_2O$ solution. The carrier was rotated for 1 hour, dried while being rotated for 1.5 hour, and heated in air by increasing the temperature to 120° C. in 1 hour followed by maintaining the temperature at 120° C. for 8 hours, raising the temperature to 450° C. in 1 hour and maintaining the temperature for 1 hour at 450° C.

Subsequently an impregnating solution was prepared by adding 20.0 g oxalic acid slowly at a temperature between 40° C. and 80° C. to an aqueous solution containing 9.39 g ammonium poly vanadate dissolved in 40 ml water. At a temperature of 50° C. a solution of 2.34 g $NH_4Br$ in 10 ml water was added, and 74 ml of impregnating solution was obtained, which solution was clear and had a blue color.

With 72 ml of this impregnation solution 85 g of the titanium coated carrier was contacted. The carrier was rotated for 1 hour, dried while being rotated for 2 hours, and heated in air by increasing the temperature to 120° C. in 1 hour followed by maintaining the temperature at 120° C. for 8 hours, raising the temperature to 450° C. in 1 hour and maintaining the temperature for 1 hour at 450° C. After this treatment the color of catalyst sample 3 was light brown.

Data pertaining to catalyst sample 3 have been included in Table 1.

EXAMPLE 4

Catalyst sample 4 was prepared according to the invention as follows. At first 85 g of silicon oxide carrier was contacted with 152 ml of an aqueous impregnating solution containing a titanium compound and a bromine compound. The impregnating solution was prepared as follows. In a container 27.67 g of an aqueous solution containing 25% by mass $NH_4OH$ was added at a temperature between 40° C. and 80° C. to 103.04 g of an acidic $TiCl_4/H_2O$ solution. Subsequently, 10 ml water was added, and at a temperature of 50° C. 4.64 g $NH_4Br$ dissolved in 8 ml water was added. No bromine escaped. Water was added to obtain a volume of 156 ml. Thereupon 85 g of silicon oxide carrier was contacted with 152 ml of this impregnating solution. The carrier was rotated for 1 hour, dried while being rotated for 2 hours, and heated in air by increasing the temperature to 120° C. in 1 hour followed by maintaining the temperature at 120° C. for 8 hours, raising the temperature to 450° C. in 1 hour and maintaining the temperature for 1 hour at 450° C.

Subsequently, an impregnating solution was prepared by adding 19.03 g oxalic acid slowly at a temperature between 40° C. and 80° C. to an aqueous solution containing 9.19 g ammonium poly vanadate dissolved in 50 ml water. A volume of 77 ml of impregnating solution was obtained, which solution was clear and had a blue color.

With 68 ml of this impregnation solution 85 g of the titanium coated carrier was contacted. The carrier was rotated for 1 hour, dried while being rotated for 2 hours, and heated in air by increasing the temperature to 120° C. in 1 hour followed by maintaining the temperature at 120° C. for 8 hours, raising the temperature to 450° C. in 1 hour and maintaining the temperature for 1 hour at 450° C. After this treatment the color of catalyst sample 4 was light brown yellow.

Data pertaining to catalyst sample 4 have been included in Table 1.

TABLE 1

| catalyst sample | specific area m$_2$/g | % Ti mass content | | | XPS atomic ratio | |
|---|---|---|---|---|---|---|
| | | % V | ppm | Br— | Ti/Si | V/Si |
| 1 | 220 | 5.22 | 5.25 | 12 | 0.023 | 0.031 |
| 2 | 198 | 4.88 | 5.08 | <100 | 0.016 | 0.028 |
| 3 | — | 4.66 | 4.20 | 24 | 0.009 | 0.045 |
| 4 | 166 | 4.34 | 3.66 | 114 | 0.003 | 0.039 |

In Table 1 "—" denotes that a volume has not been determined.

EXAMPLE 5

Catalyst sample 5 was prepared according to the invention as follows. In a container 10.35 g ammonium poly vanadate was mixed with 57.17 g of an acidic solution of $TiCl_4/H_2O$ and 15 ml of an aqueous solution containing 30% by mass of hydrogen chloride. After stirring for 30 minutes at a temperature between 30° C. and 35° C., all components were completely dissolved. Heating was stopped. Subsequently, 9 ml of an aqueous solution containing 4.11 g $NH_4F$ was added.

Thereupon 85 g of silicon oxide carrier was contacted with 77 ml of the impregnating solution. The carrier was rotated for 1 hour, dried while being rotated for 2 hours, and heated in air by increasing the temperature of 120° C. in 1 hour followed by maintaining the temperature at 120° C. for 8 hours, raising the temperature to 450° C. in 1 hour and maintaining the temperature for 1 hour at 450° C. After this treatment the color of catalyst sample 5 was green brown. The catalyst sample 5 contained 5.13% by mass titanium, 5.35% by mass vanadium and 2.00 by mass fluorine, and its specific area was 147 m$^2$/g.

EXAMPLE 6

To study the activity of catalyst samples 1 and 5 for the reduction of nitrogen oxide in the presence of NH$_3$, a sample thereof was arranged in a reactor having a volume of 60 ml and a gaseous mixture having a predetermined temperature was supplied to the reactor at a predetermined rate. The composition of the effluents leaving the reactor was determined with a Thermo Electron model 10A analyzer.

The composition of the gaseous mixture used was 5% by volume O$_2$, 13% by volume CO$_2$, 6% by volume H$_2$0, 400 ppmv (parts per million by volume) NO, and 600 ppmv NH$_3$, the remainder being nitrogen.

The gaseous mixture was supplied to the reactor at atmospheric pressure and at such rates that the gas hourly space velocity was 4000 Nm$^3$/m$^3$/hour and 10000 Nm$^3$/m$^3$/hour, wherein 1 Nm$^3$ gas equals 1 m$^3$ at 20° C. and 0.1 MPa.

The conversion is defined as the ratio of the difference of the NO concentrations in the gaseous mixture and in the effluent to the NO concentration in the gaseous mixture.

For catalyst sample 1 the conversion at a gas hourly space velocity of 4000 Nm$^3$/m$^3$/hour and at a temperature of 150° C. was 92%, and at a temperature of 200° C. more than 99.5%, and the conversion at a gas hourly space velocity of 10000 Nm$^3$/m$^3$/hour and at a temperature of 150° C. was 64%, and at a temperature of 200° C. 94%.

For catalyst sample 5 the conversion at a gas hourly space velocity of 4000 Nm$^3$/m$^3$/hour and at a temperature of 150° C. was 84%, and at a temperature of 200° C. 99%.

COMPARATIVE EXAMPLE

A titanium and vanadium containing catalyst was prepared as follows. At first 700 g of silicon oxide carrier was contacted with an impregnating solution containing 361 ml TiCl$_4$/H$_2$O and 424 ml H$_2$O and the carrier was rotated for 1 hour. Subsequently, the carrier was dried while being rotated for 2.5 hours, and then dried at 120° C. for 2 hours, and thermally treated by raising the temperature to 450° C. in 1 hour. Subsequently, 85 g of the treated carrier was contacted with 69.5 ml of aqueous solution containing 8.78 g ammonium poly vanadate and 21 g H$_2$C$_2$O$_4$ and the carrier was rotated for 1 hour. Subsequently, the carrier was dried while being rotated for 1.5 hours, dried at 120° C. for 8 hours, and thermally treated by raising the temperature to 450° C. in 1 hour and maintaining the temperature for 1 hour at 450° C. The catalyst sample contained 5.10% by mass titanium and 4.86% by mass vanadium, and its specific area was 194 m$^2$/g.

The gaseous mixture of Example 6 was contacted under the conditions of Example 6 with this catalyst sample. The NO conversion at a gas hourly space velocity of 4000 Nm$^3$/m$^3$/hour at 150° C. was 54% and at 200° C. 94%.

What is claimed is:

1. A process of preparing a bimetallic catalyst comprising
    (a) applying a titanium compound to an inorganic carrier;
    (b) applying, simultaneously with or after applying the titanium compound, to the inorganic carrier at least one additive which is selected from the group consisting of a bromine compound, a fluorine compound and an iodine compound;
    (c) applying, simultaneously with or after applying the additive, to the inorganic carrier a vanadium compound;
    (d) drying the carrier; and
    (e) subjecting the carrier to a heat treatment at a temperature between 200° C. and 800° C.

2. A process according to claim 1, wherein the carrier is first contacted with a solution containing a titanium compound, and subsequently with an acidic solution containing the additive(s) and a vanadium compound.

3. A process according to claim 1, wherein the carrier is first contacted with an acidic solution containing a titanium compound and the additive(s), and subsequently with a solution containing a vanadium compound.

4. A process according to claim 1, wherein the carrier is contacted with an acidic solution containing a titanium compound, the additive(s) and a vanadium compound.

5. A process according to claim 1, wherein the pH of the acidic solution used is less than 5.

6. A process according to claim 1, wherein the titanium compound used is a titanium halide, an organic titanium salt or an ortho-titanic acid.

7. A process according to claim 1, wherein the vanadium compound used is vanadyl chloride, vanadyl bromide, vanadyl sulfate or ammonium poly vanadate.

8. A process according to claim 1, wherein the additive is a bromine compound.

9. A process according to claim 8, wherein the bromine compound used is hydrogen bromide or ammonium bromide.

10. A process according to claim 1, wherein the additive is a fluorine compound.

11. A process according to claim 10, wherein the fluorine compound used is hydrogen fluoride or ammonium fluoride.

12. A process according to claim 1, wherein (a) the titanium compound is a titanium halide, an organic titanium salt or otho-titanic acid; (b) is a bromine compound and (c) the vanadium compound is vanadyl chloride, vanadyl bromide, vanadyl sulfate or ammonium poly vanadate.

13. A process according to claim 12, wherein(a) is titanium chloride; (b) is hydrogen bromine or ammonium bromide; and (c) ammonium poly vanadate.

14. A catalyst for the reduction of nitrogen oxides prepared according to the process according to claim 1 comprising an inorganic carrier, 2-15% by mass of titanium, 0.5-5% by mass fluorine and 2-15% by mass vanadium.

* * * * *